US00RE35205E

United States Patent [19]

Bar

[11] E Patent Number: Re. 35,205

[45] Reissued Date of Patent: Apr. 9, 1996

[54] METHOD AND APPARATUS FOR DETERMINING THE FORMAT OF A MAGNETIC TAPE AND FOR PRESETTING A MAGNETIC HEAD TO A REFERENCE TRACK THEREOF

[75] Inventor: Refael Bar, San Diego, Calif.

[73] Assignee: Iomega Corporation, Roy, Utah

[21] Appl. No.: 286,812

[22] Filed: Aug. 5, 1994

Related U.S. Patent Documents

Reissue of:

[64] Patent No.: 5,268,802
Issued: Dec. 7, 1993
Appl. No.: 706,045
Filed: May 28, 1991

[51] Int. Cl.[6] ..... H04N 5/783

[52] U.S. Cl. ..... 360/77.13; 360/77.12; 360/78.02; 360/25; 360/134

[58] Field of Search ..... 360/78.02, 77.13, 360/77.12, 48, 60, 25, 77.08, 62, 63, 134

[56] References Cited

U.S. PATENT DOCUMENTS

| | | | |
|---|---|---|---|
| 3,526,371 | 9/1970 | Blackie et al. | 242/192 |
| 3,924,823 | 12/1975 | Cohen et al. | 242/198 |
| 3,932,894 | 1/1976 | Arter et al. | 360/134 |
| 4,011,587 | 3/1977 | Arter et al. | 360/62 |
| 4,040,100 | 8/1977 | Chan | 360/43 |
| 4,404,601 | 9/1983 | Sakamoto | 360/77.13 |
| 4,439,800 | 3/1984 | Powell | 360/78 |
| 4,484,237 | 11/1984 | Muto | 360/25 |
| 4,498,129 | 2/1985 | Velazquez | 360/174 |
| 4,586,094 | 4/1986 | Chambors et al. | 360/77 |
| 4,646,175 | 2/1987 | Sokolik et al. | 360/78 |
| 4,647,994 | 3/1987 | Irwin et al. | 360/85 |
| 4,811,122 | 3/1989 | Kido et al. | 360/25 |
| 4,863,114 | 9/1989 | Moeller | 242/188 |
| 4,928,192 | 5/1990 | Bartlett et al. | 360/77.08 |
| 4,984,111 | 1/1991 | Rudi | 360/96.5 |
| 5,253,124 | 10/1993 | Kondo et al. | 360/48 |

OTHER PUBLICATIONS

"Flexible–Disk–Controller–Compatible Recording Format For Information Interchange", QIC–80 Revision D, Dec. 6, 1989.

"Common Command Set Interface Specification For Flexible Disk Controller Based Minicartridge Tape Drives", QIC–117, Revision B, Dec. 6, 1989.

*Primary Examiner*—Timothy P. Callahan
*Assistant Examiner*—Kenneth B. Wells
*Attorney, Agent, or Firm*—Woodcock Washburn Kurtz Mackiewicz & Norris

[57] ABSTRACT

A magnetic tape drive has firmware which has been modified so that the drive will read both standard formal tapes and non-standard format tapes. Non-standard tapes are detected by an absence of reference bursts in the load zone of the tape. The head is moved to successive tracks toward the edge of the tape until no data is read. This identifies the track near the edge of the tape. Then, the head is preset to a track which is a known distance from the edge of the tape. Reading of non-standard tapes is accomplished by disabling the index pulse generator in the intervals between data segments. The performance of a SKIP COMMAND is made possible by counting the transitions of data to no data during the intervals between data segments. The identification of different types of non-standard formats is made by determining the length of the data segments.

35 Claims, 13 Drawing Sheets

METHOD AND APPARATUS FOR DETERMINING THE FORMAT OF A MAGNETIC TAPE AND FOR PRESETTING A MAGNETIC HEAD TO A REFERENCE TRACK THEREOF

Matter enclosed in heavy brackets [ ] appears in the original patent but forms no part of this reissue specification; matter printed in italics indicates the additions made by reissue.

FIELD OF THE INVENTION

This invention relates to a magnetic tape drive, and more particularly, to a tape drive which can read tapes written in non-standard formats, as well as a standard format tape.

BACKGROUND OF THE INVENTION

U.S. Pat. No. 4,863,114—Moeller, et al shows a mini-cartridge in which magnetic tape stores computer data. Small tape drives for writing and reading data stored on ¼-inch tape in these mini-cartridges are commonly used in personal computer systems. U.S. Pat. Nos. 3 526,371—Blackie et al; 3,924,823—Cohen, et al; 4,647,994—Irwin, et al; and 4,984,111—Rudi are examples of drives utilizing this type of data cartridge.

Quarter-Inch Cartridge Drive Standards Inc. 311 East Carillo Street, Santa Barbara, Calif. 93101 publishes development standards adopted by several manufacturers for this type of disk drive. These standards describe an 80/120 megabyte, 28-track, 14,700 bpi (579 bmm) MFM-encoded flexible disk controller compatible recording format using a ¼-inch mini-data cartridge. Published standards include "FLEXIBLE-DISK-CONTROLLER-COMPATIBLE RECORDING FORMAT FOR INFORMATION INTERCHANGE", QIC-80 Revision D, 6 Dec. 1989 and "COMMON COMMAND SET INTERFACE SPECIFICATION FOR FLEXIBLE DISK CONTROLLER BASED MINICARTRIDGE TAPE DRIVES", QIC-117, Revision B, 6 Dec. 1989. These published standards are incorporated hereto by reference. Companies which make tape drives for reading and writing tapes to these standards include:

| |
|---|
| Mountain Network Solution<br>240 East Hacienda Avenue<br>Campbell, CA 95008<br>Wangtek Corp.<br>41 Morehand Road<br>Seme Valley, CA 92605<br>Archive Corp.<br>1650 Sanflower Avenue<br>Costamesa, CA 92626<br>CMS Enhancements<br>1372 Valencia Avenue<br>Fustin, CA 92680 |

Similar tape drives are available which write tapes in a format which is not compatible with the QIC standards. One example of such a drive is that manufactured by Irwin Magnetics, Inc. U.S. Pat. Nos. 4,646,175; 4,586,094—Chambors, et al and 4,498,129 describe the tape drive and format of tapes written on these drives.

SUMMARY OF THE INVENTION

In accordance with the present invention, a magnetic tape drive reads [both standard and non-standard tapes] *tapes written in both a first, standard format and an other, non-standard format.* A determination is made as to whether a non-standard tape is present. If so, the magnetic head is preset by first moving the magnetic head toward the edge of [he] *the* tape. When no data is sensed, indicating the edge of the data, the head is moved to the center of track 0.

More specifically, the load zone of the tape is first read to determine whether the tape is written in a *first,* standard *format* or [a] *an other,* non-standard format. If the format appears to be non-standard, the head must be preset to a reference track, for example, track 0. In order to do this, the head is moved toward the edge of the tape, while reading the successive tracks. The edge of the data tracks is identified when no data is read. Thereafter, the head is moved a known distance from the edge of the tape to a specified track, for example, track 0.

It is an object of the present invention to provide for reading of both standard and non-standard tapes without changing the electronics or the physical characteristics of the drive. Only changes in the tape drive firmware are required to practice the invention.

In accordance with the present invention, non-standard tapes can be read by generating an index pulse at the beginning of each segment. For non-standard tapes, this is accomplished by disabling the index pulse generator while non-relevant, servo, information is detected in the spaces between segments.

In accordance with still another aspect of the invention, tapes having different non-standard formats can be read.

SHORT DESCRIPTION OF THE DRAWINGS

*FIGS. 2A–B depict* the firmware and the interface for a tape drive in which the present invention is incorporated;

DESCRIPTION OF THE PREFERRED EMBODIMENT

Figure 1:
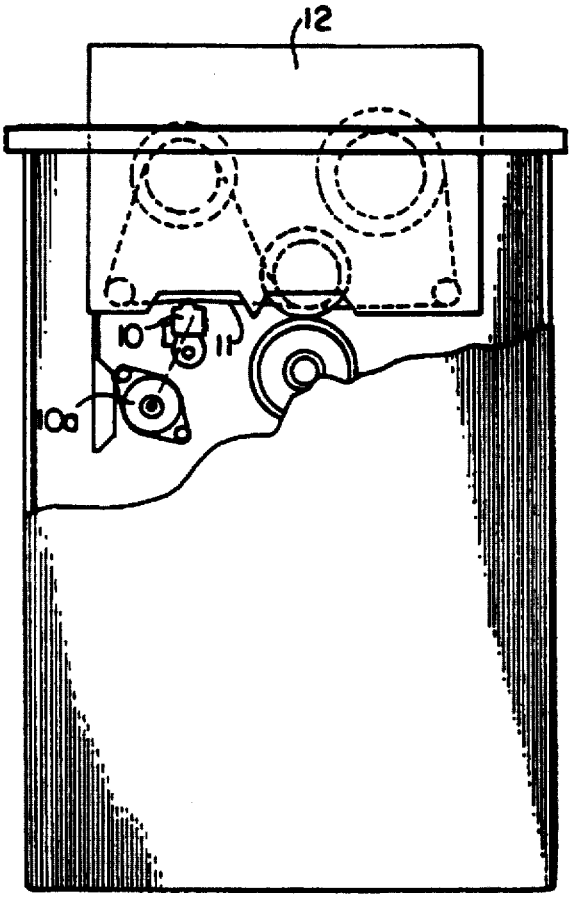
FIG. 1 shows a tape drive of the type in which the present invention is incorporated.

A specific example illustrating the invention shows the changes needed in the firmware of a tape drive which will read QIC tapes. In accordance with the invention, these changes make the drive capable of reading both standard QIC written tapes and tapes written in the non-standard IRWIN format. As an introduction, the following signals and terms are defined.

| Signals and Terms Vocabulary | |
|---|---|
| BLOCK | A group of 1024 consecutive bytes transferred as a unit. |
| BOT | Beginning of tape marker, indicating beginning of tape. |
| DATA SEGMENT | A segment containing directory and/or file information. |
| DENSITY | The maximum allowable flux transitions per unit length for a specific recording standard. |
| EARLY WARNING | Marker on the tape indicating the end of the permissible recording area, for even numbered tracks, and indicating the start of the permissible recording area for odd numbered tracks. |
| EOT | End of tape marker, indicating the end of the tape. |
| EVEN TRACKS | Tracks numbered 0, 2, 4, etc. (least significant bit is zero) |
| ERASED TAPE | The removal of all magnetically recorded information from the tape. |
| EOT | End of tape marker, indicating end of tape. |
| FLUX TRANSITION | A point on the magnetic tape which exhibits maximum free space flux density normal to the tape surface. |
| FORMAT | The operation of preparing the cartridge for use by formatting the tape. |
| GAP DETECT | A signal from the tape drive's read electronics to the MICRO PROCESSOR or the ASIC chip on the IOTAPE drive, that indicates detection of data, or the absence of data. |
| INDEX PULSE | A signal marking the location of the data segment on the tape during the execution of the Logical Forward command. This signal is defined in the QIC117 specifications. |
| LOAD POINT | Marker on the tape indicating the start of the permissible recording area for even numbered tracks, and indicating the end of the permissible recording area for odd numbered tracks. |
| LOGICAL FORMAT | A directory and file structure suitable for information storage and retrieval. |
| LOGICAL FORWARD COMMAND | A command to the tape drive defined in the QIC117 specifications. |
| COMMAND | A command to the tape drive defined in QIC117 specifications. |
| MICRO STEP COMMAND | A command to the tape drive defined by the QIC117 specifications. |
| QIC117 | A standard defining the communication between the host software and the tape drive. |
| QIC40 | A standard defining the physical tape format for 40 megabytes drives, on mini-cartridges. |
| QIC80 | A standard defining the physical tape format for 80 megabytes drives on a mini-cartridge. |
| QIC SOFTWARE | Computer programs that allow the users to debug, write, read, and issue QIC117 commands to a QIC117 tape drive. |
| QIC REFERENCE | Recorded information between the BOT and Load Point markers that defines the format recorded on the tape, and the reference track position for odd and even tracks as defined in the QIC80 or QIC140 standards. |
| SEEK HEAD TO TRACK | A command to the tape drive defined by the QIC117 specifications. |
| SKIP COMMANDS | Commands to the tape drive that are defined by the QIC117 specifications. |
| TRACK | A recording strip parallel to the edge of the magnetic tape, containing recorded information. |

Description of a QIC Standard Tape Drive

FIG. 1 depicts a tape drive having a magnetic head 10 which is moved across a magnetic tape 11 in steps by a stepping motor 10a. Tape 11 moves between the reels in a cartridge 12. As the head moves across the tape, it reads data on the longitudinal tracks of the magnetic tape 11.

Figure 2:
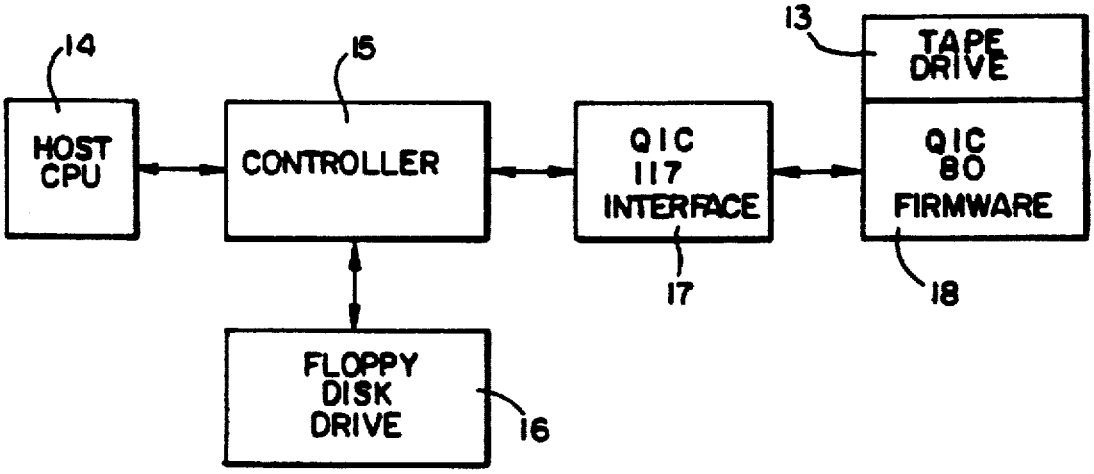
FIG. 2 is a block diagram showing the tape drive of the present invention configured in a computer system.

FIG. 2 shows the tape drive 13 in a typical configuration of a personal computer system. The system includes a host computer 14 and a controller 15. Controller 15 is typically capable of operating peripherals, such as the floppy disk drive 16. The controller 15 is connected to tape drive 13 through an interface 17. In the example under consideration, the interface 17 is specified by the aforementioned QIC117 standards. Tape drive 13 has firmware 18 which performs the operations required to meet the aforementioned QIC80 and QIC117 standards.

Figure 2A:
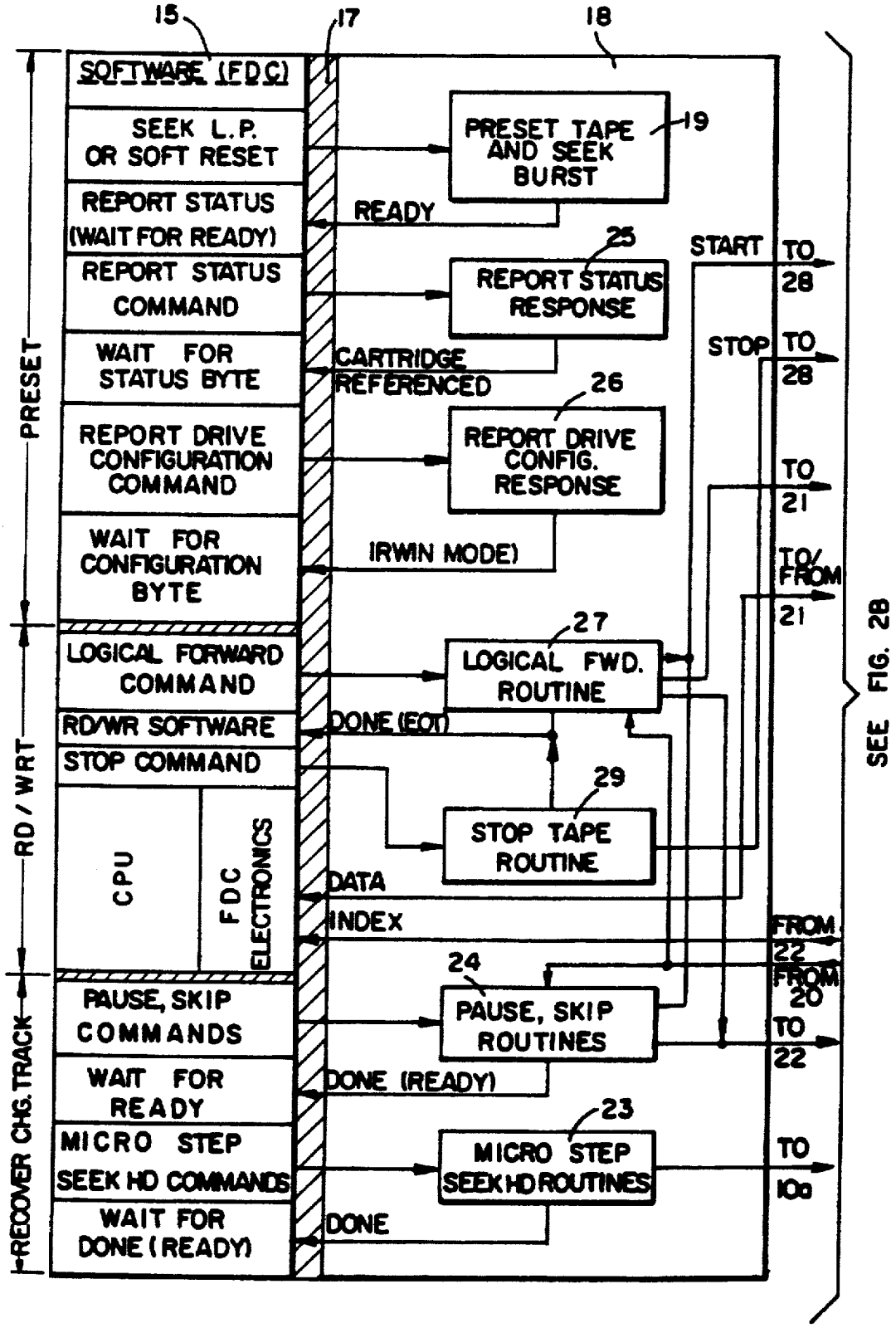
[FIG. 2A depicts]
Figure 2B:
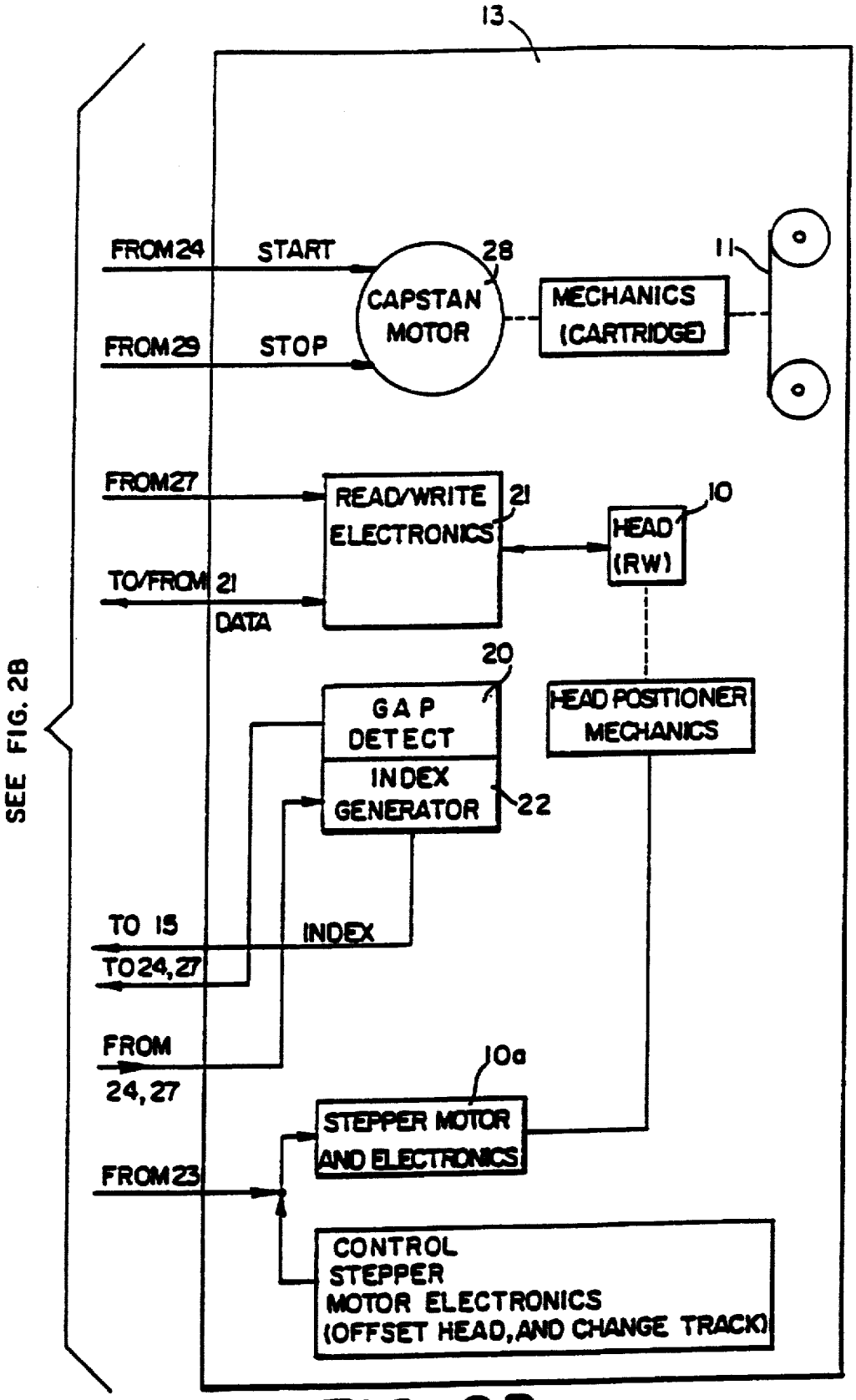

The significant parts of the firmware 18 are depicted [in FIG. 2A. FIG. 2A also depicts] *in FIGS. 2A–B. FIGS. 2A–B also depict* the relevant commands and status indications in the interface 17 and the relevant routines performed in the floppy disk controller 15.

In response to a SEEK LOAD POINT command (or a SOFT RESET command) the PRESET TAPE AND SEEK BURST routine 19 in the firmware presets the head and tape to the reference track on the tape. This is track 0 in the QIC format. When this routine detects a non-standard, i.e., an IRWIN tape, the routine also presets the head to track 0. However, the procedure is quite different as will be explained.

When the routine 19 has preset the tape, it issues a READY status. The software in floppy disk controller 15 then issues a REPORT STATUS command. Firmware 18 has a REPORT STATUS RESPONSE routine 25 which generates a CARTRIDGE REFERENCED byte.

The floppy disk controller 15 issues a REPORT DRIVE CONFIGURATION command in response to the CARTRIDGE REFERENCED byte. The REPORT DRIVE CONFIGURATION routine 26 indicates the format of the tape.

If the appropriate status bit is set to 1, a QIC 80 mode tape has been detected. If this bit is a 0, there is an indication that a QIC 40 mode has been detected. In accordance with the present invention, a status bit is also set to indicate when a non-standard format (i.e., IRWIN mode) has been detected.

The software in floppy disk controller 15 then issues a LOGICAL FORWARD command to interface 17. The logical forward routine 27 in the firmware 18 starts the capstan motor 28 at the appropriate speed. LOGICAL FORWARD routine 27 also enables the read/write electronics 21 after the motor is at speed. This enables the reading of data from the head 10 by the read/write electronics 21. This data is supplied to the CPU through the floppy disk controller. The read/write software in the floppy disk controller issues the proper commands to store data in the buffers and perform other operations on the data.

Software in the floppy disk controller issues a STOP command and in response thereto, the STOP TAPE routine 29 stops the capstan motor 28. This continues until the end of tape at which time the LOGICAL FORWARD routine 27 issues a DONE status.

The gap detect electronics 20 in a QIC drive control the reading of data by generating index pulses at the beginning of each data segment, as will be subsequently described. Read electronics 21 produces a DATA signal as the magnetic head 10 reads the tape. The GAP DETECT electronics produces a signal which is the envelope of the DATA signal. When reading a QIC format tape, an index pulse generator 22 produces an index pulse each time data is detected. This marks the beginning of a data segment.

In accordance with the present invention, the reading of IRWIN formatted tapes is facilitated by disabling the index pulse generator 22 when servo information, which exists in gaps between data segments in Irwin tapes, is detected.

In response to PAUSE and SKIP commands from the software in the floppy disk controller 15, the firmware 18 performs PAUSE and SKIP routines 24. These routines are performed when there is a need to recover, or change tracks. These routines will enable the capstan motor 28 and enable the index generator 22. When the proper number of segments has been counted, the routines 24 issue a DONE (READY) status to the floppy disk controller.

In accordance with the invention, the firmware 18 is also modified so that the drive will perform a SKIP routine 24 on IRWIN formatted tapes. This is a command that is required by the QIC 11 standard and should perform with both the QIC standard tapes or Irwin.

QIC machines also have the capability of correcting the position of the head when errors are caused by positioning of the head with respect to the tape track. When such errors are detected, the MICRO STEP SEEK HEAD routines 23 act through stepper motor 10a to adjust the position of head 10 with respect to the track.

The Format of a QIC Tape

Figure 3:
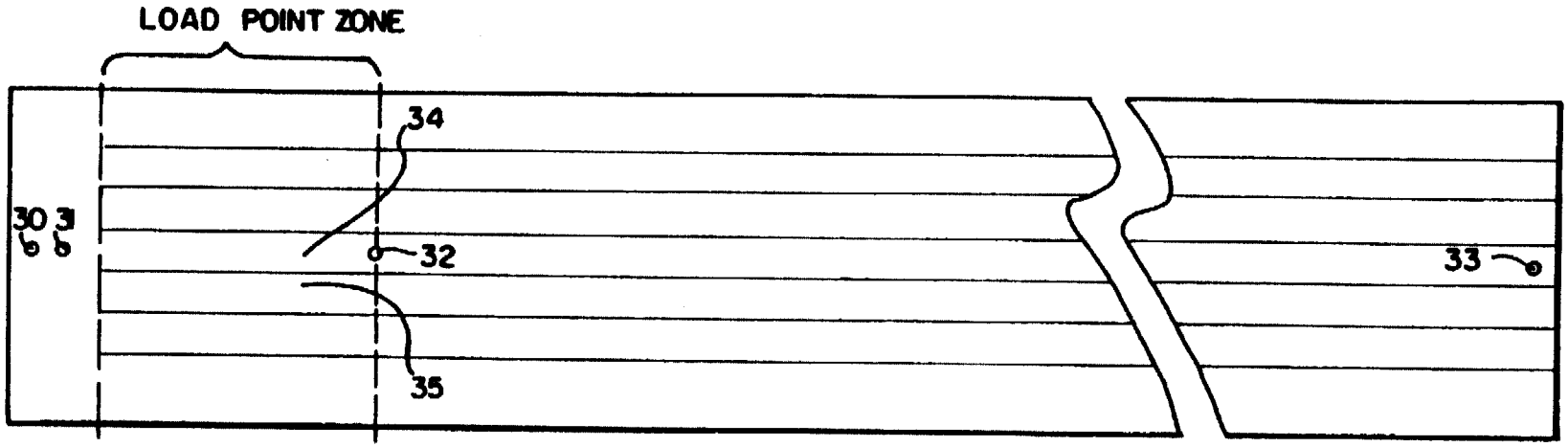
FIG. 3 depicts the format of a QIC tape.

FIG. 3 depicts the layout of a QIC-formatted tape. Two physical holes 30 and 31 in the tape mark the beginning of tape (BOT). Another hole 32 marks the load point (LP). Between the BOT and the LP is a load point zone. Between the load point 32 and the warning hole 33 is 205' of tape upon which data is written. This referred to as the DATA ZONE.

Track 0 has a forward reference burst at 34 in the load zone. Track 3 has a reverse reference burst at 35 in the load zone. These reference bursts are described on page 10 of "QIC DEVELOPMENT STANDARD FLEXIBLE DISK CONTROLLER COMPATIBLE RECORDING FORMAT FOR INFORMATION INTERCHANGE", QIC-80 6 Dec. 1989. In the QIC format, all of the even tracks are written above track 0 and are referenced to track 0. All of the odd tracks are written below track 0, and all odd tracks are referenced to track 3. The firmware of a QIC tape drive has a SEEK BURST routine which, during initialization of the drive, finds the reference bursts on track 0 and centers the head on track 0. When the head is on track 0, the firmware indicates a CARTRIDGE-REFERENCED status through the QIC 117 interface to the host computer. If no reference bursts are found during the performance of the SEEK BURST algorithm, the firmware of a normal QIC-compatible machine will report one of the other statuses shown at page 7 of QIC DEVELOPMENT STANDARD, "COMMON COMMAND SET INTERFACE SPECIFICATION FOR FLEXIBLE DISK CONTROLLER BASED MINI-CARTRIDGE TAPE DRIVES", QIC 117, Rev. B. 6 Dec. 89. This will be in response to a REPORT DRIVE STATUS command from the host. Bit 7 in Table 2(c) is set to a 1 if a QIC 80 mode is detected. This bit is not set if a QIC 40 format is detected.

Figure 6:
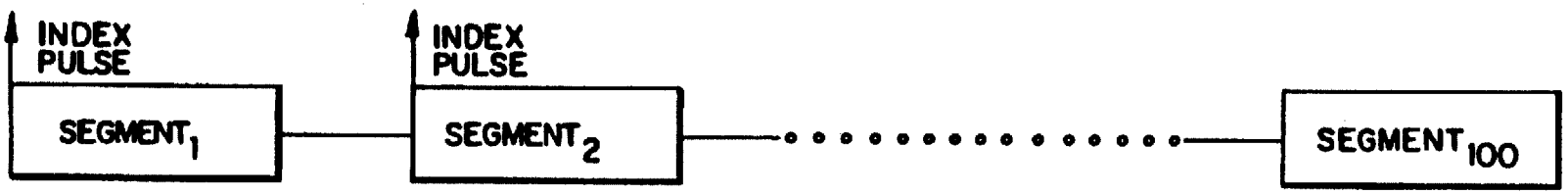
FIG. 6 shows the layout of the data segments in a QIC format.

FIG. 6 depicts the layout of the data segments in a QIC format. In the QIC format, there are 100 data segments each including 32 sectors and each sector has 1024 bytes. Between the segments, are 20 millisecond gaps. An index pulse is generated at the beginning of each data segment for use by the host computer in reading data. The index pulse is generated by reading the GAP DETECT signal, which is the envelope of the DATA signal. In a normal QIC drive the index pulse is generated each time the GAP DETECT signal makes a transition from no data to data.

Format Of the Non-Standard Irwin Tapes

Figure 4:
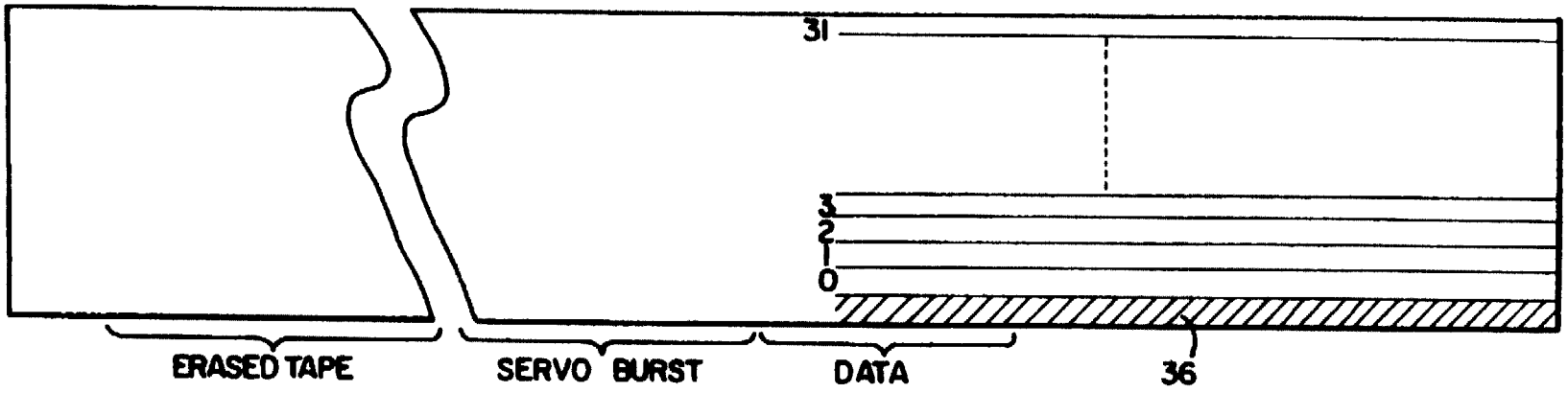
FIG. 4 depicts the format of an Irwin tape.

FIG. 4 depicts the format of the IRWIN tapes. The 32 tracks are consecutively numbered from 0–31, extending from edge to edge of the tape. (Tracks are numbered from 0–19 in the Irwin 40 format to be discussed later). Very little, if any, unrecorded space exists between the tracks. At each edge of the tape, there is a narrow gap, indicated at 36, of unrecorded tape.

A more complete description of the IRWIN format is given in the aforementioned patents assigned to Irwin Magnetics, Inc.

Figure 5:
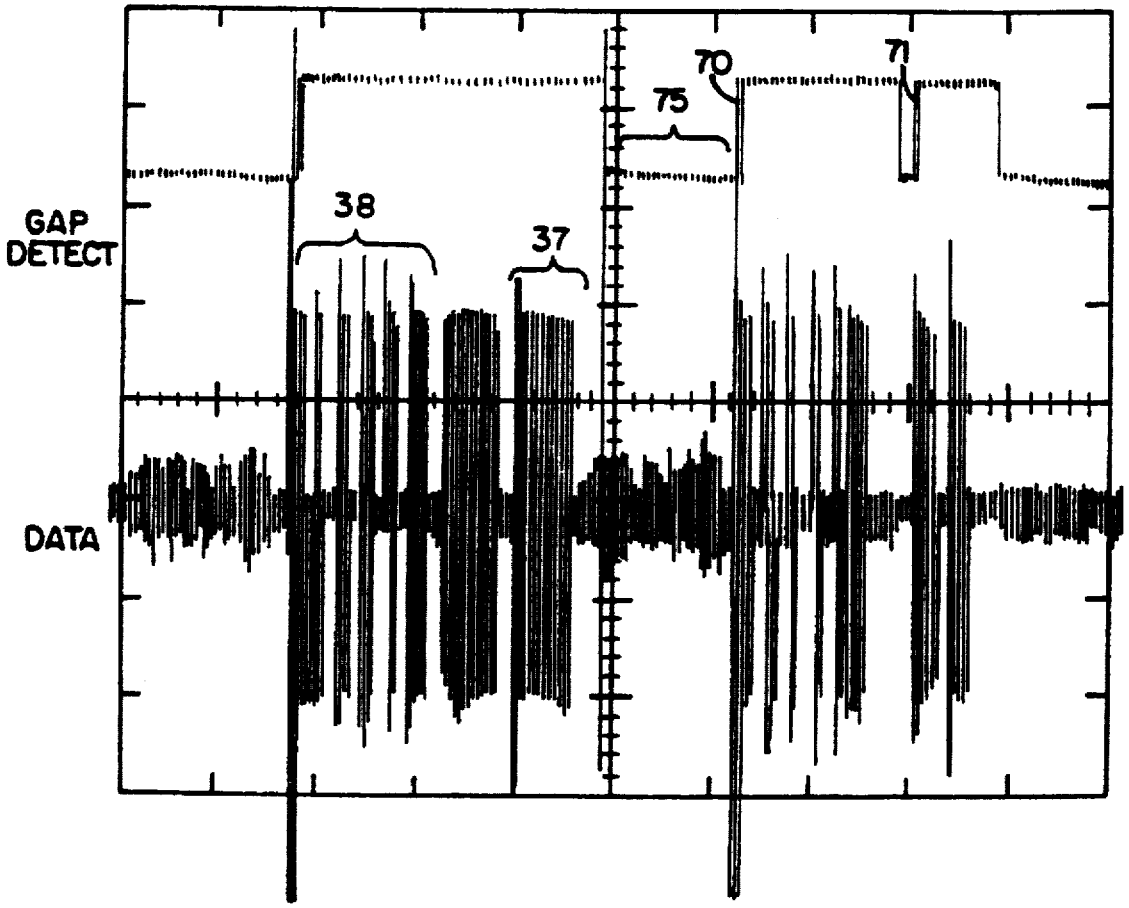
FIG. 5 shows the data signal and the GAP DETECT signal for an odd numbered track on an Irwin drive.

FIG. 5 shows the signal read from a typical odd track, in this case track 1. A servo burst 37 is between data segments on the tape. FIG. 5 also shows the track identification information 38 comprising five bits recorded as a narrow burst for a zero and a wide burst for a one. FIG. 5 shows the identification (I.D.) for track 1 which is 00001. FIG. 5 also shows the GAP DETECT signal 29 for track 1. This signal is the envelope of the data signal and is used in producing the index pulse in accordance with the invention.

Figure 7:
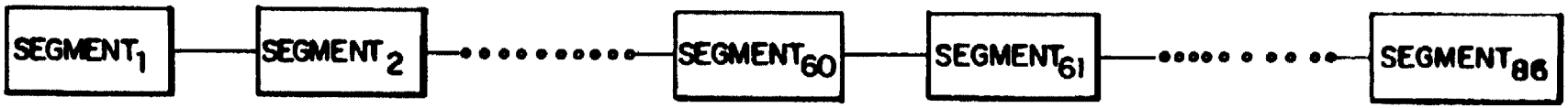
FIG. 7 shows the layout of data segments in an Irwin format.

The format of the Irwin 80 data is shown in FIG. 7. There are 86 data segments on a typical tape written in the Irwin 80 format. Each segment has 32 sectors, 1024 bytes in each sector, and 32 tracks per tape.

Between segments on the Irwin tape, servo information is written. This servo information is used to control the heads on Irwin machines in order to keep the head on track. Because of the presence of this servo information, an index pulse cannot be generated at the beginning of each data segment in the normal manner that this is accomplished in QIC drives.

Figure 11:
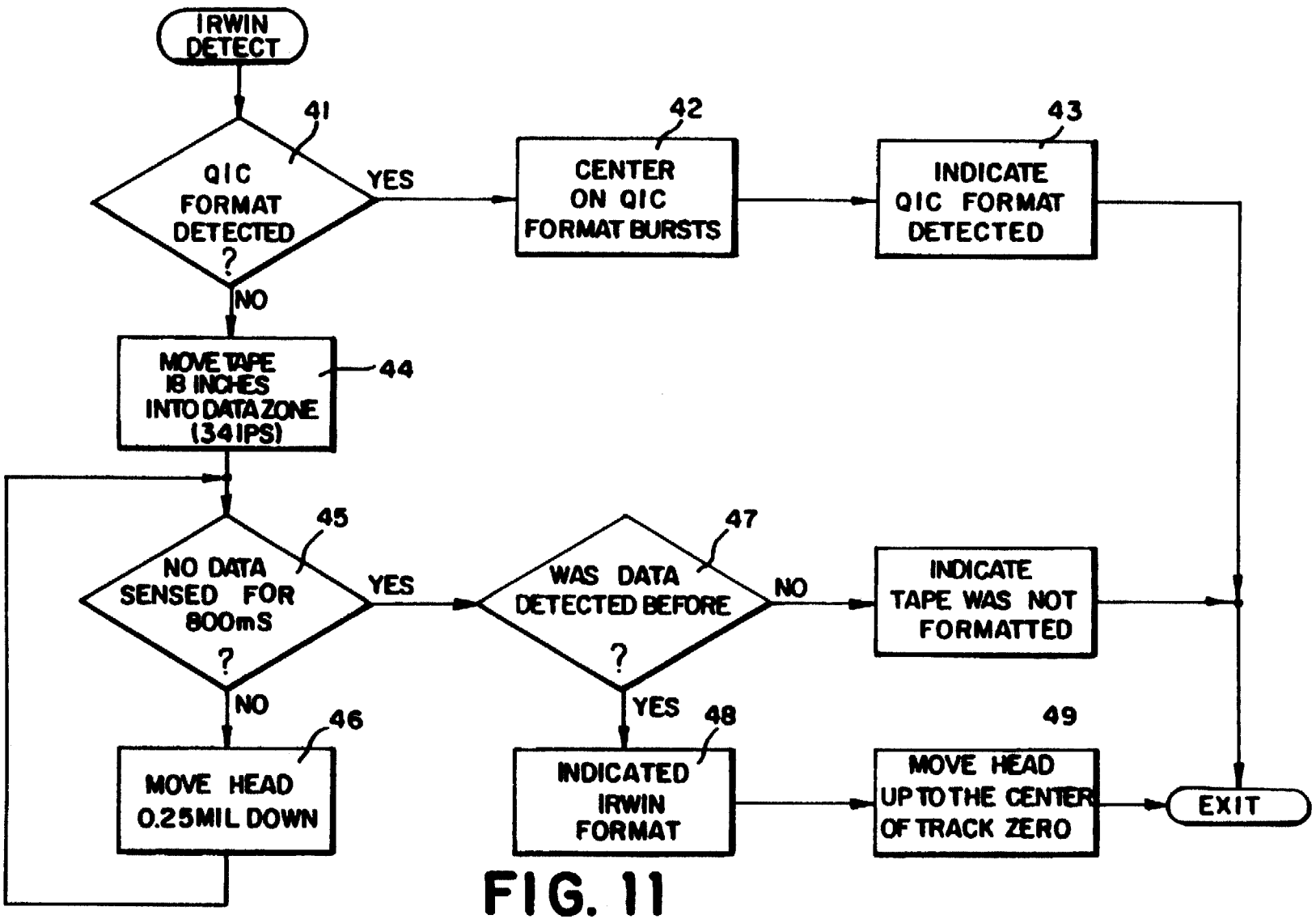
FIG. 11 is a flow chart showing the firmware for initializing the tape drive including centering the head on track 0.

Presetting the Drive When Either Standard or Non-standard (i.e. Irwin) Tapes Are Present The SEEK BURST routine in a QIC tape drive's firmware is modified to place the head on the reference track (track 0) when a QIC or an Irwin format is detected. FIG. 11 is a flow chart depicting the steps. The following steps are performed.

Rewind the tape to BOT.

Get the head to home position (place the head on tape).

Search for reference bursts in the load zone. If a reference burst is detected, the flag 41 is set to YES. This indicates that a reference burst was detected in the load point zone. The head is centered on the bursts (step 42) and an indication that a QIC format has been detected is applied to the interface (step 43).

If no reference burst is detected, go to step 44. Displace 18 feet of tape at 34 ips into the DATA ZONE. The 18 feet of tape displacement in the data zone is done to avoid the long erased gap at the beginning of the tape that is mentioned above (104 inches of erased tape at the start of track). Also, the beginning of the servo burst information would be avoided (862 msec of Irwin servo information at start of track).

While moving the tap at 34 ips, look for 800 msec of consecutive no data readings. This is step 45. This is done to avoid detecting servo information in erase gaps. The 800 msec timeout was chosen to avoid detecting erased tape in between the data segments (Irwin servo information).

Each time DATA is detected, within the 800 msec window, go to step 46. Move the head one step (0.25 mils) down.

When 800 msec of erased tape is detected, go to the step 47. The routine assumes that the lower edge of the data (bottom track) is detected. If data was detected before, as determined by step 47, an Irwin format is indicated (step 48).

Step 49 moves the head a fixed number of steps to the center of track 0.

Rewind to DOT at 100 ips.

Indicate CARTRIDGE REFERENCED status to the QIC 117 host.

Indicate IRWIN MOD status through the QIC 117 interface to the host. This status is indicated by setting bit 0 defined in Table 2(c) on page 7 of QIC-117, "COMMON COMMAND SET INTERFACE SPECIFICATION FOR FLEXIBLE DISK CONTROLLER BASED MINICARTRIDGE TAPE DRIVES", Rev. B, 8 Dec. 1989. This bit was reserved for future use. The status is reported in response to the REPORT DRIVE CONFIGURATION command.

Changing SEEK HEAD TO TRACK Routine

The SEEK HEAD TO TRACK routine will step the head to the QIC 117 host requested track. Normally, the SEEK HEAD TO TRACK ROUTINE steps the head to the requested track by looking at the QIC 80 (QIC 40) flag. The stepping is done per the QIC 80 (or QIC 40) standard with the addition of the Irwin format to the drive. The fixed number of steps between the centers of Irwin track and the track layout is determined. The SEEK HEAD TO TRACK ROUTINE is changed so that when the host requests a track change, and the drive and host are both in the Irwin format, the drive will change its track position according to the Irwin format track layout. In response to an Irwin mode status, this routine places the head at track 0, 1, 2 . . . up to track 31, going from the lower end of the tape to the upper end of the tape, with 30 steps in between tracks (0.25 mils per steps.) (In the Irwin 40 format, there are 20 tracks numbered 0 to 11. The number of steps is 46 instead of 30.)

Reading Irwin Tapes

FIG. 5 shows the "GAP DETECT" input from the read electronics. The firmware uses the "GAP DETECT" signal to count transitions of the servo burst. The transition is validated with a 0.5 msec. timeout, that insures that no "glitches" are detected as a transition.

In order to read the Irwin tape, the servo pattern used by Irwin to position the head on track is masked from the floppy controller, and the index pulse is inserted at the beginning of the segment. This operation avoids giving the floppy disk controller (FDC) an index pulse for the servo information that is in between the segments.

Figure 12:
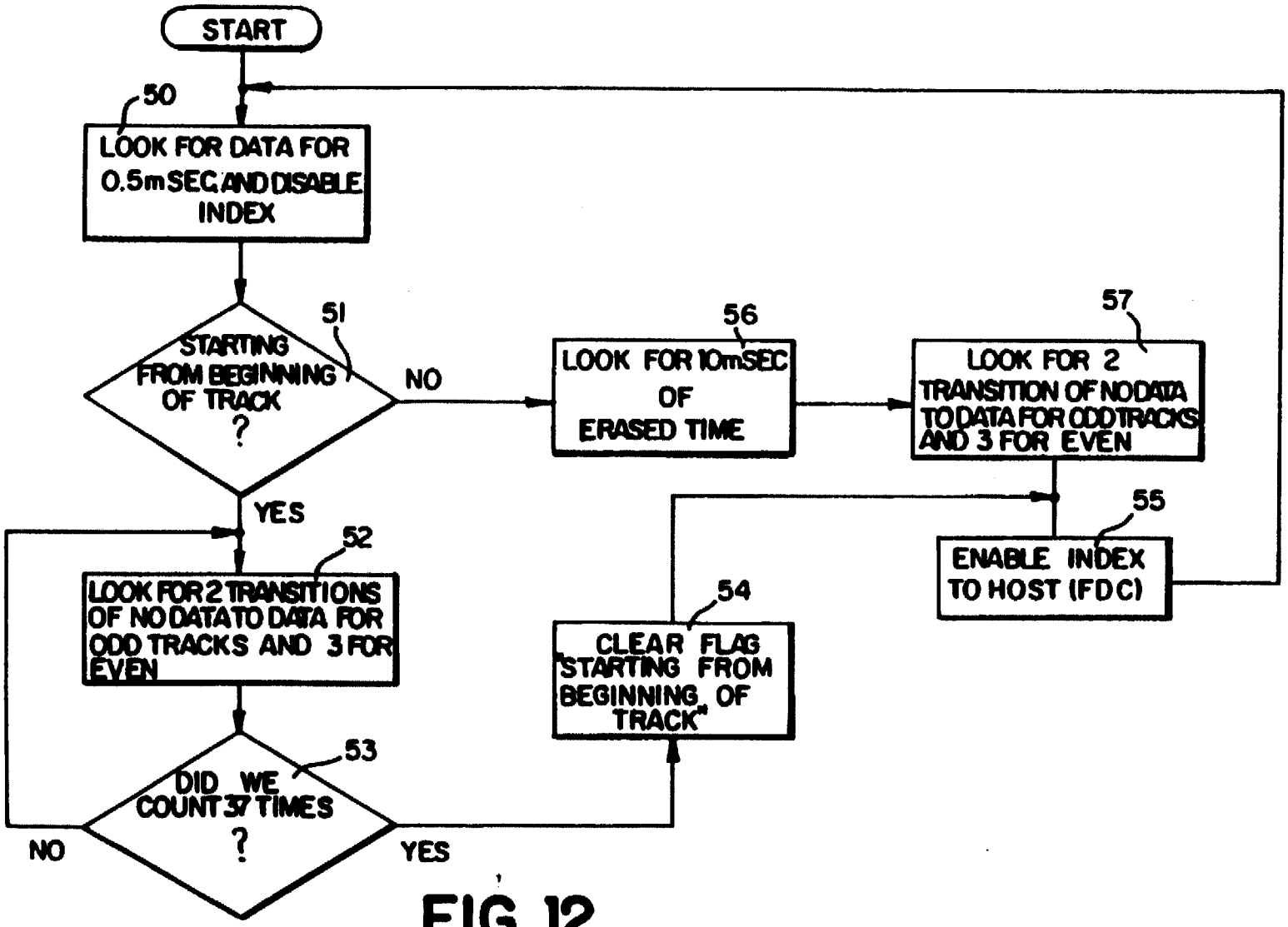
FIG. 12 is a flow chart of the firmware for reading Irwin tapes.

The firmware on a QIC drive was modified as shown in FIG. 12.

Figure 8:
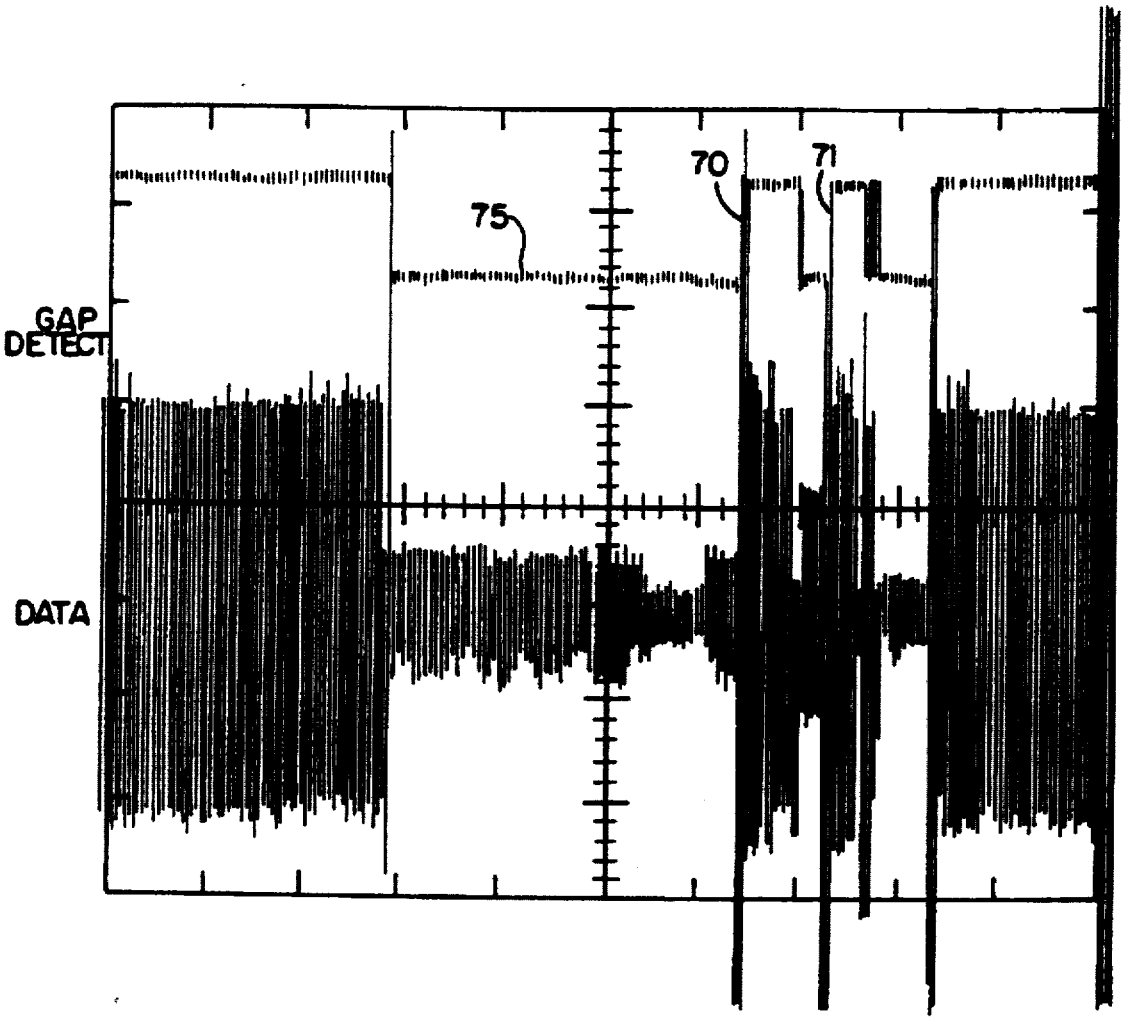
FIG. 8 shows the data signal and GAP DETECT signal for another odd track of an Irwin formatting tape.
Figure 9:
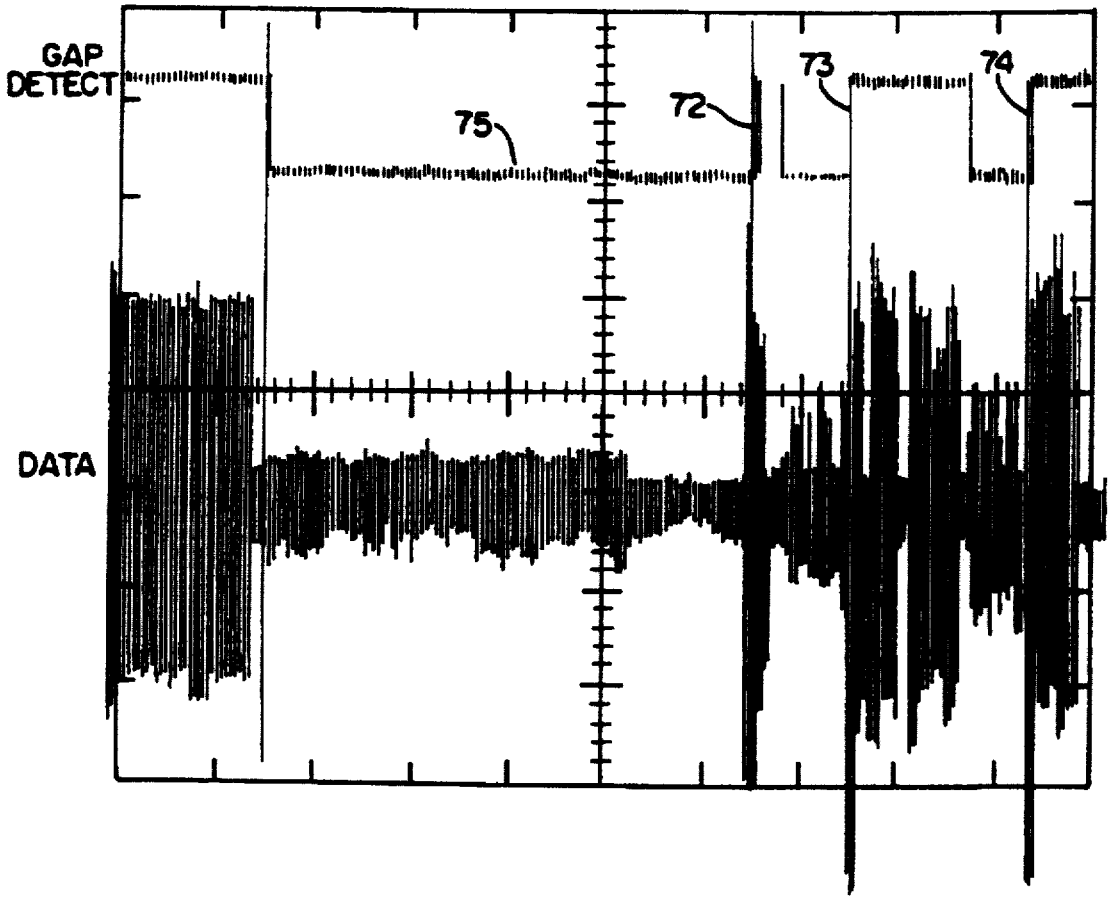
FIG. 9 shows the data signal and the GAP DETECT signal for an even track on an Irwin formatted tape.
Figure 10:
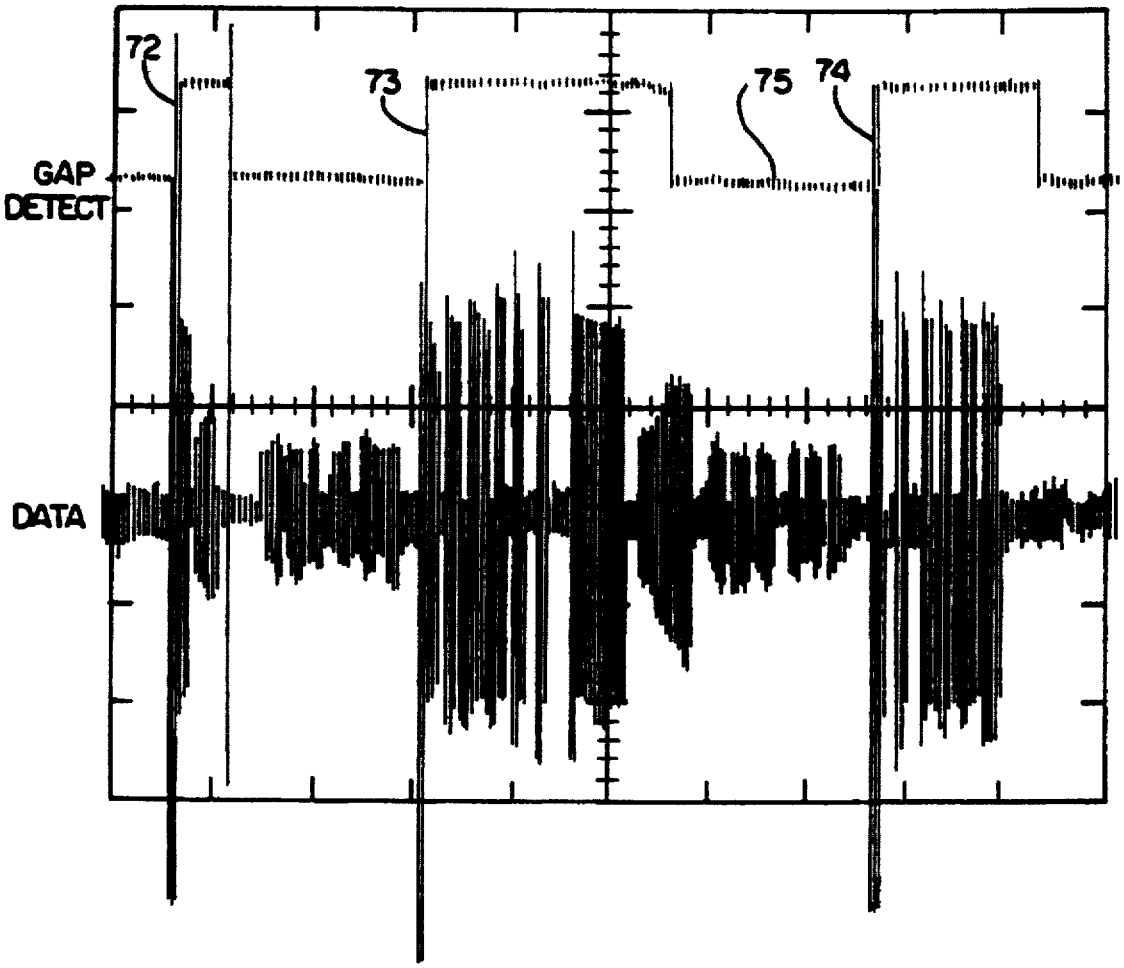
FIG. 10 shows the read signal and GAP DETECT signal for another eve track of an Irwin formatted tape.

When an Irwin tape has been detected, each time the GAP DETECT signal shows the presence of data, the index pulse generator is disabled, as indicated at 50. Flag 51 is set in accordance with whether the tape is starting from the beginning of the track or in the middle of data segments. If starting from the beginning of the track, it is necessary to skip the servo burst which occurs in the first 16 or 17 feet of the tape. On the Irwin tapes, servo information is written in with two transitions of NO DATA to DATA or odd tracks and three transitions of NO DATA to DATA for even tracks. The two transitions 70 and 71 are shown in FIGS. 5 and 8 for odd tracks and the three transitions 72, 73 and 74 are shown in FIGS. 9 and 10 for even tracks. The step 52 looks for these sequences of transitions. In order to timeout the long burst of servo information at the beginning of the tape, these transitions are counted 37 times by step 52. After 37 detections of such transitions, the flag 53 is set to YES. This indicates the first data segment is detected.

In response to this YES indication, the step 54 clears the flag 51 so there is no longer an indication that the drive is starting from the beginning of a track. Also, the index pulse generator is enabled, as indicated by step 55. This enables the generation of an index pulse indicating the start of the first data segment.

The next time the gap detect signal indicates a transition from NO DATA to DATA, the index pulse generator is disabled again as indicated at 50. This time, the flag 51 will indicate that the drive is not starting from the beginning of tape. Between data segments, the Irwin tapes have an ERASE GAP 75, which is relatively short compared to the much longer gap between data segments on standard QIC formatted tape. The ERASE GAP on the Irwin tapes is approximately 10 milliseconds long. (at 40 ips.) The ERASE GAP is indicated at 75 in FIGS. 5, 8–10. An ERASE GAP precedes the servo information. This ERASE GAP is detected as indicated at step 56 in FIG. 12. Then, the remainder of the time interval between data segments is timed out. This is done by counting the data transitions in the servo information by the step 57. This is done to bypass the servo information between the data segments. Two transitions of NO DATA to DATA occur for odd tracks and three such transitions for even tracks. After this burst of servo information, the index pulse generator is enabled, as indicated at 55.

In summary, the following steps are performed:

If starting from the beginning of track: avoid the 2596 msec of erased tape, looking for the first data detection from the GAP DETECT electronics;

Timeout 870 msec which avoids the start of track servo pattern. This is done by counting 37 transitions of data to no data.

Enable index pulse generation.

If in the data portion of a track: look for 10 msec of consecutive erased tape (see FIG. 8 for odd tracks and FIG. 9 for even tracks erased gap). generate an index pulse after the servo transitions.

The above continues until the logical end of track, or until a STOP command is received from the QIC 117 interface.

The head positioning servo data used by Irwin to position its read head to the center of the track, is completely ignored by the drive of the present invention.

The firmware in the drive of the present invention would avoid moving the head while the user's software is reading data, unless instructed by the user's software to do so. The MICRO STEP PAUSE command (QIC 117 specifications) allows the user's software to recover a read error, by stepping the head, and retrying the read until the data is recovered. This compensates for the inaccuracy of the head placement that is a result in variations between track positions on the IRWIN tapes.

Performing the SKIP Command on Irwin Tapes

Figure 13:
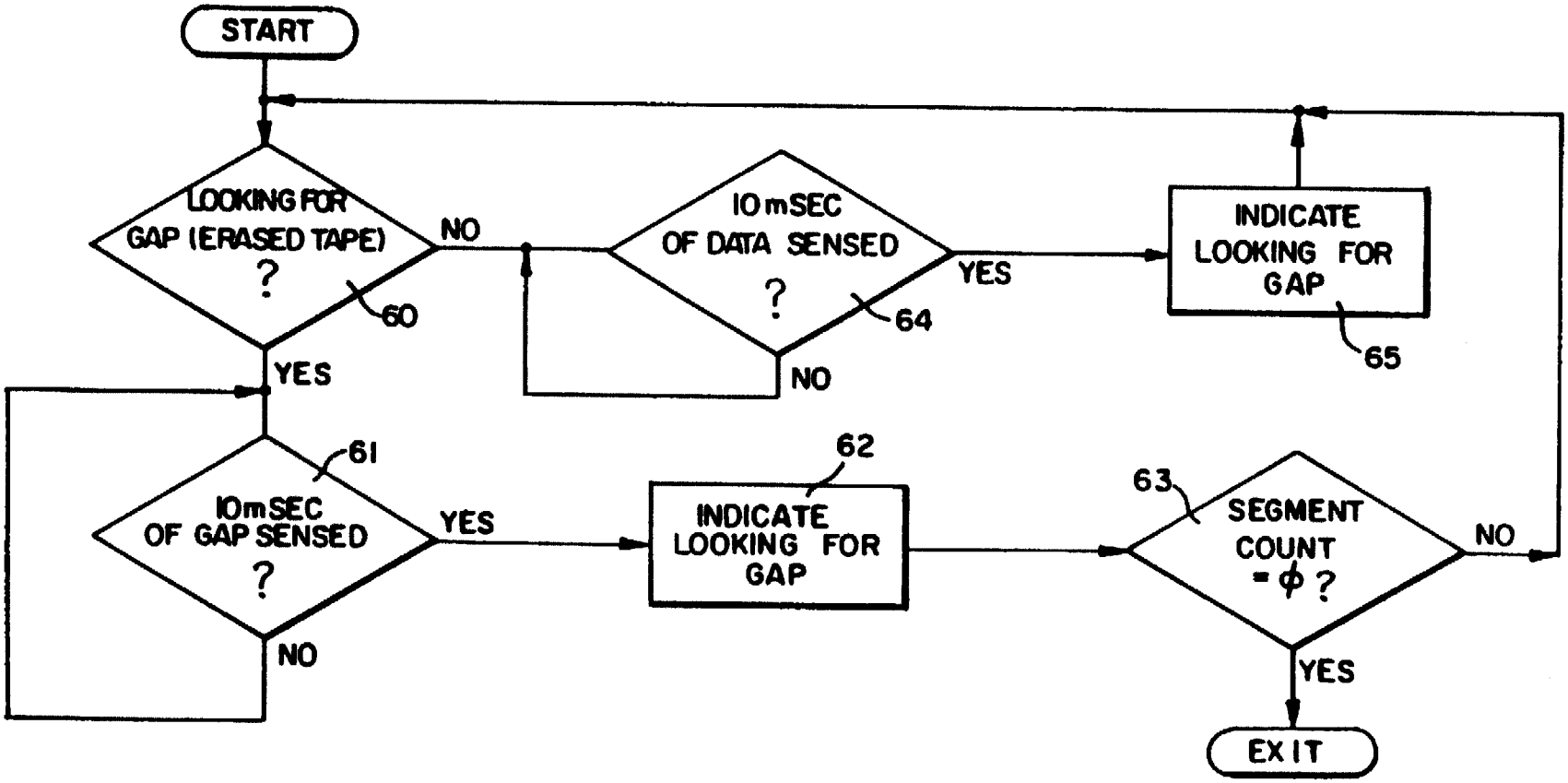
FIG. 13 is a flow chart of the firmware for performing SKIP commands.

FIG. 13 shows the modification in the firmware which will perform a SKIP SEGMENT command from the QIC 117 interface.

A flag 60 is set in accordance with whether the firmware is looking for a GAP. If it is, a determination is made as to whether 10 msec of GAP is sensed, as indicated by flag 61. If 10 msec is not sensed, the loop is repeated until 10 msec of GAP is sensed, thereby getting a YES indication from flag 61. This means that the tape is at a position where the head is about to read a data segment. As indicated at 62, the firmware is set so that it is looking for data. This flips the flag 60 to the NO condition. It also decrements the counter 63 by one count. Counter 63 is set with the number of data segments which are to be skipped. It counts the erased gaps 35 of the servo bursts which are between segments. Assume the command is SKIP 10 FORWARD. This counter is set to ten and is decremented each time a data segment is counted. During normal reading of a QIC tape, the counter is decremented each time there is an index pulse. When reading Irwin tapes, the counter is decremented each time there is a servo burst in between segments. When the counter is decremented to zero, there is an exit indicating that the number of specified segments have been counted.

If counter 63 is at other than 0, a NO indication, the loop is repeated.

The routine returns to the beginning of the loop. This time, the flag 60 will indicate that the firmware is not looking for a GAP. The flag 64 is looking for ten msec of data. If ten msec of data is found, a YES indication, then the step 65 resets the flag 60 to "looking for a gap". If the flag 64 does not detect 10 msec of data, a NO indication, the firmware continues to look for 10 msec of data.

In this way, the number of data segments through which the head reads is counted until the specified number of data segments has been skipped.

Reading Different Formats of Non-Standard Tapes

In accordance with a modification of the invention, the reading of different formats of non-standard tapes may be accomplished. For example, Irwin tapes are written in both an Irwin 40 format for 40 megabyte drives and an Irwin 80 format for 80 megabyte drives. What has been described thus far is for an Irwin 80 format. The Irwin 40 format differs in the number of sectors per segment, 18, whereas Irwin 80 has 32 segments; in the number of segments per track, 124, whereas Irwin 80 had 86 segments; the number of tracks per tape, 20, whereas Irwin 80 had 32; and in the track spacing, 11.6 mils, whereas Irwin 80 had 7.25 mil spacing.

In order to read Irwin 40 tapes, it is only necessary to change the tape speed and to obtain correct presetting on track 0. Both of these can be done by the detection of Irwin 40 tapes, which in accordance with the invention, is accomplished by detecting the difference in the length of the data segments in the Irwin 40 format as opposed to Irwin 80 tapes.

The Irwin format detection routine, which is a part of the Seek Burst routine, is changed. This is so that the drive's firmware is able to indicate to the user's software the presence of an Irwin 40 or an Irwin 80 tape in the drive. Also, since the track width of the Irwin 40 format is different from the track width of the Irwin 80, the firmware needs an indication to know when to correct the track center point.

Figure 14:
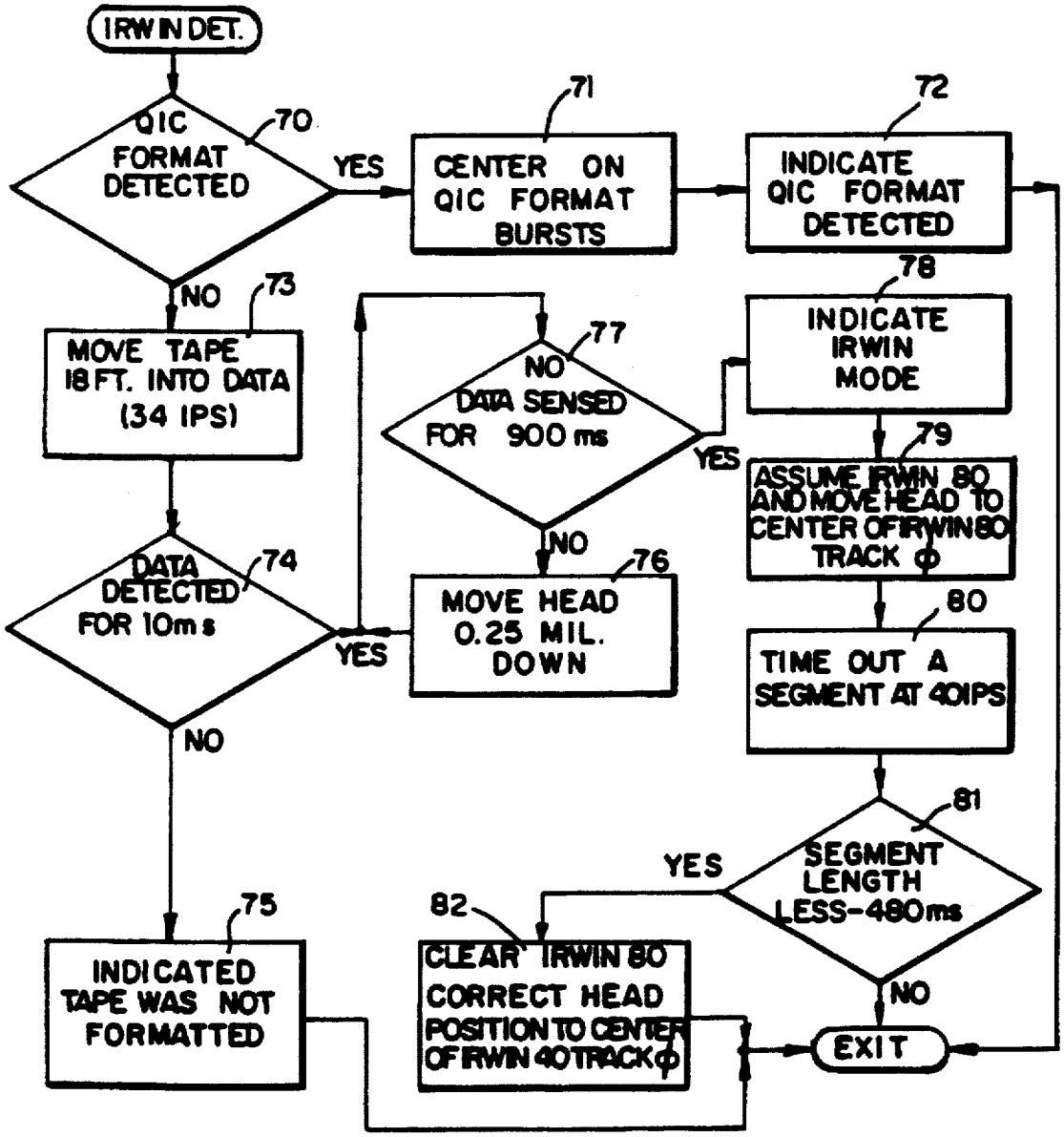
FIG. 14 is a flow chart of the firmware for detecting different Irwin formats.

FIG. 14 is a flow chart which is a modification of the flowchart of FIG. 11. FIG. 14 describes the firmware for reading both of the Irwin formats.

The routine starts by scanning the load point zone for QIC type reference burst as indicated by flag 70. If those bursts are found, the routine centers on the track 0 reference burst (step 71), and indicates the appropriate QIC format to the user (step 72), as described with reference to the Report Drive Configuration command of the QIC 117 standard.

If the QIC reference bursts are not detected, the step 73 starts the tape at 34 ips from BOT, and displace 18 feet of tape in the data zone.

At this point, the routine determines whether the tape contains data in the data zone (in which case it might be an Irwin tape), or whether the tape is not formatted at all. The step 74 looks for 10 msec of consecutive DATA detect from the GAP DETECT signal. If there are 256 consecutive samples of NO DATA at 0.5 msec intervals, the step 75 indicates that the tape is not formatted at all. If the tape was not formatted, the routine clears the CARTRIDGE REFERENCED flag in the REPORT DRIVE STATUS byte of the QIC117 standard and exits.

When the routine concludes that the data zone contains data, it tries to find the bottom edge of the lower track on the tape (on the Irwin tapes this is track 0). This is done by step 76 which moves the head in 0.25 mils steps, until 900 msec of consecutive NO DATA detection is timed out. Flag 77 indicates YES when the 900 msec interval is timed out.

At this point, the routine detected the bottom edge of the lower track on the tape, but the type of format on the tape is an unknown. Therefore, the routine does not know to what point to step the head in order to center on track 0. For now, the step 78 indicates that the IRWIN MODE is detected (bit 1 of the REPORT DRIVE CONFIGURATION byte).

In order to detect the tape format, the routine takes advantage of the fact that the segment on the Irwin 80 format is longer than the Irwin 40 segment (32 sectors compared to 18 sectors respectively). Running at 40 ips, the segment length of the Irwin 80 format would be approximately 580 msec long, and for the Irwin 40 approximately 380 msec long.

The step 79 assumes that the tape is an Irwin 80 tape, therefore, clearing the flag which indicates Irwin 40 (REPORT DRIVE CONFIGURATION byte, bit 2), and stepping the head a fixed number of steps (31), to the center of track 0, to what is assumed to be track 0 of the Irwin 80 tape. The tape is started at 40 ips, and the segment length is measured by the step 80. If the flag 81 indicates YES, the length of the segment was found to be less than 480 msec long (middle point between 380 msec segment length and the 580 msec segment length), the tape is considered to be an Irwin 40 tape. The step 82 adds 17 more steps to the 31 steps that it steeped already for the Irwin 80 tape (total of 48 steps), so that the center line of track 0 on the Irwin 40 tape would be corrected. The Irwin 40 flag is set, and the routine is complete. If the length of the segment was found to be equal or greater than 480 msec, the routine is complete (the head is already at the center of the Irwin 80 track 0, and the Irwin 40 flag is cleared).

The Logical forward Irwin 80 routine does not have to change to accommodate the Irwin 40 format, only tape speed is changed from 40 to 50 ips when reading Irwin 40 tapes.

The SKIP command algorithm for the Irwin 80 does not have to change to accommodate the Irwin 40 format.

The number of tracks need to be changed from 32 to 20 in the Seek Head to Track Irwin 80 routine, to accommodate the Irwin 40 format.

Implementation of the Preferred Embodiment

Changes in the firmware of a QIC 40 or QIC 80 compatible tape drive constitute the preferred way of practicing the invention. For example, this firmware is imbedded in Intel 8051 integrated circuit chips. The programming of these chips is apparent from the user's instructions for these chips and from the foregoing description of the invention.

While a particular embodiment of the invention has been sown and described, various modifications are within the true spirit and scope of the invention. The appended claims are, therefore, intended to cover all such modifications.

What is claimed is:

1. In a magnetic tape drive for digital computer backup of the type in which a magnetic head is moved across a magnetic tape to read digital data on longitudinal tracks between the *lateral* edges of said magnetic tape, said longitudinal tracks having load zone and data zone portions, [the] *a* method of presetting said magnetic head to a reference track on tapes written [on both standard and non-standard formats] *in either a first format or an other format* comprising:

reading a load zone portion *and a data zone portion* of said tape;

determining [the format of said data in said load zone to determine] *from reading said load zone and said data zone portions* whether said tape is written in said [standard] *first* format [or a non-standard] , *said other* format[;] , *or is unformatted, said performing the following additional steps if the determined format is said other format:* moving said head [to] *over* successive *longitudinal* tracks toward one *lateral* edge of said tape [if the determined format is non-standard];

[reading data] *detecting whether data is present* in the data zones of said successive *longitudinal* tracks *as said head moves toward said one lateral edge*;

identifying [the] *the location of said one lateral* edge of said tape when [no] data is [read] *no longer detected*; and moving said head a [known] *predetermined* distance from [the edge of said tape to said] *said identified location to the* reference track *of said other format.*

2. The method recited on claim 1 wherein said tape drive is connected through an interface to a controller and host computer and wherein [said standard] *the first* format [tape] is written in segments of data along each of said *longitudinal* tracks, wherein there are relatively large blank gaps between said segments, and wherein an index pulse at the end of each gap signifies the start of each data segment, [the method of reading data from non-standard tapes which have] *and further wherein said other format has* relatively small blank gaps between data segments and irrelevant data in the remaining portion [of the track] between the data segments *of each longitudinal track, said method further* comprising *the following additional steps when the determined format is said other format*:

detecting said relatively small blank gaps;

timing out the remainder of a time interval between data segments in response to said detection; and generating an artificial index pulse at the end of the timing out, said index pulse being supplied to the interface of said tape drive.

3. The method recited in claim 2 wherein said irrelevant data is servo information.

4. The method recited in claim 3 wherein the step of timing out the remainder of the time interval between data segments comprises:

counting data transitions in said servo information; and enabling the generation of said index pulse after a predetermined number of [such] *said data* transitions have occurred.

5. The method recited in claim 2 wherein [the tape drive is connected to a controller by an] *said* interface [which] transmits a SKIP command to the tape drive specifying movement of *the* tape by a specified number of data segments in the forward or reverse [directions] *direction*, said method further comprising performing [a] *the* SKIP command on a [non-standard tape] *tape having said other format* by the steps of:

counting said small blank gaps during performance of [a] *the* SKIP command, and exiting the performance of said SKIP command when the count equals said specified number of data segments.

6. The method recited in claim 2 *wherein said tape is written in either said first format or one of a plurality of different types of other formats, the method* further comprising *the following steps when the determined format is one of said other formats*:

determining the length of said data segments on [said non-standard tapes] *the tape having one of said other formats*; and indicating the type of [non-standard tape] *said one of said other formats* based on the length of said data segments.

7. In a magnetic tape drive of the type in which a magnetic head is moved across a magnetic tape to read data on longitudinal tracks between the *lateral* edges of said magnetic tape, [the] *a* method of presetting said magnetic head to a reference track on [tapes] *a tape* written in [both standard and non-standard formats] *either a first format or an other format,* said [standard] *first* format having load zone and data zone portions and reference bursts in tracks in said load zone, *said other format having data zone portions but having no such reference bursts in a portion corresponding to the load zone portion of said first format, said method* comprising:

[reading a load zone portion of said tape;]

determining whether said tape is written in said [standard or a non-standard] *first format, said other* format [from the data read in said load zone], *or is unformatted* said step of determining including:

searching for said reference bursts in *a portion of said tape corresponding to* said load zone *portion of said first format;* providing an indication that said tape is written in [a non-standard] *said first* format if [no such] reference bursts are detected, *but if no reference bursts are detected, moving said tape so that said head reads the data zone portion of said tape*;

*indicating that said tape is not formatted if no data is read in said data zone portion, but if data is read in said data zone portion, indicating that said tape is written in said other format; and*

[moving said head to successive tracks toward one edge of said tape if the determined format is non-standard;

reading data in the data zones of said successive tracks;

identifying the edge of said tape when no data is read; and]

*if the determined format is said other format,* moving said head a [known] *predetermined* distance [from the edge of said tape] to [said] *the* reference track *of said other format.*

8. In a magnetic tape drive of the type in which a magnetic head is moved across a magnetic tape to read data on longitudinal tracks between the *lateral* edges of said magnetic tape, [the] *a* method of presetting said magnetic head to a reference track on [tapes] *a tape* written in [both standard and non-standard formats] *either a first format or an other format, said first format having load zone and data zone portions and reference bursts in longitudinal tracks in said load zone, said other format having data zone portions but having no such reference bursts in a portion corresponding to the load zone portion of said first format, said method* comprising:

reading a *portion of said tape corresponding to the* load zone portion of said [tape] *first format* ;

determining whether said tape is written in said [standard] *first format* or [a non-standard] *said other* format from [the] data read in [said] *the portion corresponding to said* load zone [;] *portion, and performing the following steps if the determined format is said other format:* moving said head [to] *over* successive *longitudinal* tracks toward [the] *one lateral* edge of said tape [if the determined format is non standard];

[reading data] *detecting whether data is present* in the data zones of said successive *longitudinal* tracks *as said head moves toward said one lateral edge*;

identifying the *location of said one lateral* edge of said tape when [no] data is [read] *no longer detected* ; and moving said head a [known] *predetermined* distance from the [edge of said tape] *identified location* to [said] *the* reference track *of said other format*, said [steps] *step* of moving said head *over successive longitudinal tracks* being carried out in incremental steps across said tape.

9. The method recited in claim [7] *8* further comprising:

moving said tape through said *portion corresponding to the* load zone *portion of said first format and* into said data zone before the step of [reading data] *detecting whether data is present* in *the data zone of said* successive *longitudinal* tracks.

10. The method recited in claim 8 wherein the step of moving said head a [known] *predetermined* distance from the *identified location of said one lateral* edge of the tape includes moving a fixed number of said incremental steps.

11. The method recited in claim 8 wherein said tape has a beginning of tape marker, said method thereafter comprising the step of:

rewinding said tape to the beginning of tape marker on said tape.

12. In a magnetic tape drive of the type in which a magnetic head is moved across a magnetic tape to read data on the longitudinal tracks between the *lateral* edges of said magnetic tape, [said longitudinal tracks having load zone and data zone portions, the] *a* method of presetting said magnetic head to a reference track on [tapes] *a tape* written in [both standard and non-standard formats] *either a first format or an other format, said first format having load zone and data zone portions and reference bursts in longitudinal tracks in said load zone, said other format having data zone portions but having no such reference bursts in a portion corresponding to the load zone portion of said first format, said method* comprising:

reading a *portion of said tape corresponding to the* load zone portion of said [tape] *first format*;

determining whether said tape is written in said [standard] *first* or [a non-standard] *said other* format from [the] data read in *the portion corresponding to* said load zone [;] *portion, and performing the following additional steps if the determined format is said other format:* moving said head [to] *over* successive *longitudinal* tracks toward one *lateral* edge of said tape [if the determined format is non-standard];

[reading data] *detecting whether data is present* in the data zones of said successive *longitudinal* tracks *as said head moves toward said one lateral edge* of said tape and detecting whether data is present in fixed intervals of reading;

identifying the *location of said one lateral* edge of said tape when [no] data is [read] *no longer detected* ; and moving said head a [known] *predetermined* distance from [the edge of said tape] *said identified location* to [said] *the* reference track *of said other format.*

13. The method recited in claim 12 wherein the step of moving said head to successive tracks includes moving said head at least one incremental step each time data is detected in one of said fixed intervals of reading.

14. The method recited in claim 13 wherein the step of identifying the *location of said one lateral* edge of said tape occurs when [no] data is *no longer* detected in said fixed intervals.

15. A magnetic tape drive of the type in which a magnetic head is moved across a magnetic tape to read data on the longitudinal tracks of said magnetic tape, [the] *a* method of presetting said magnetic head to a reference track on [tapes] *a tape* written in [both standard and non-standard formats] *either a first format or an other format, said first format having load zone and data zone portions and reference bursts in longitudinal tracks in said load zone, said other format having data zone portions but having no such reference bursts in a portion corresponding to the load zone portion of said first format, said method* comprising:

reading a *portion of said tape corresponding to the* load zone portion of said [tape] *first format*;

determining whether said tape is written in said [standard] *first* or [a non-standard] *said other* format from [the] data read in said *portion corresponding to the* load zone [;] *portion of said first format, and performing the following additional steps if the determined format is said other format:* moving said head [to] *over* successive *longitudinal* tracks toward [the] *one lateral* edge of said tape [if the determined format is non-standard];

[reading data] *detecting whether data is present* in the data zones of said successive *longitudinal* tracks including detecting whether data is present in fixed intervals of reading;

identifying the *location of said one lateral* edge of said tape when [no] data is [read] *no longer detected*; and moving said head a [known] *predetermined* distance from the [edge of said tape] *identified location* to [said] *the* reference track *of said other format*;

said magnetic tape drive being in combination with a controller and a host computer wherein said tape drive is connected through an interface to [a] *the* controller and host computer, and wherein said host computer generates a REPORT DRIVE CONFIGURATION command applied to said drive through said interface, and wherein said drive thereafter generates a NON-STANDARD MODE status to said controller through said interface.

16. In a magnetic tape drive of the type in which a magnetic head is moved across a magnetic tape to read data on longitudinal tracks of said magnetic tape and wherein said [tapes are] *magnetic tape is* written in [both standard and non-standard formats] *either a first format or an other format*, wherein said [standard] *first* format [tape] is written in segments of data along each of said tracks, wherein there are relatively large blank gaps between said segments and wherein an index pulse is generated at the end of each gap signifying the start of each data segment, [a method of reading data from non-standard tapes which have] *and further wherein said other format has* relatively small blank gaps between data segments and irrelevant data in a remaining portion [of the track] between the data segments *of each of said longitudinal tracks, a method of reading data from said tape* comprising:

determining whether said tape is written in said [standard or non-standard format from the data read in a load zone] *first format or said other format*, and in response to a determination [of a non-standard] *that said tape is written in said other* format, performing the following steps [;] *:* detecting said relatively small blank gaps;

timing out a remainder of a time interval between data segments in response to said detection; and generating an index pulse at the end of the timing out, said index pulse being supplied to an interface of said tape drive.

17. The method recited in claim 16 wherein said irrelevant data is servo information having data transitions.

18. The method recited in claim [16] *17* wherein the step of timing out the remainder of the time interval between data segments comprises:

counting data transitions in said servo information; and enabling the generation of said index pulse after a predetermined number of [such] *said data* transitions have occurred.

19. The method recited in claim 16 wherein the tape drive is connected to a controller by an interface which transmits a SKIP command to the tape drive specifying movement of *the* tape by a specified number of data segments in the forward or reverse [directions] *direction*, said method further comprising performing [a] *the* SKIP command on a [non-standard] tape *having said other format* by the steps of:

counting said small blank gaps during performance of [a] *the* SKIP command; and exiting the performance of said SKIP command when the count equals said specified number of data segments.

20. A magnetic tape drive for digital computer backup of the type in which a magnetic head is moved across a magnetic tape to read digital data on longitudinal tracks between the *lateral* edges of said magnetic tape, [said longitudinal tracks having load zone and date zone portions] and wherein said magnetic head is preset to a reference track on tapes written in [both standard and non-standard formats] *either a first format or an other format, said first format having load zone and data zone portions and reference bursts in longitudinal tracks in said load zone, said other format having data zone portions but having no such reference bursts in a portion corresponding to the load zone portion of said first format, said method* comprising:

means for reading a *portion of a tape corresponding to the* load zone portion of said [tape] *first format*;

means for determining *from data read in said portion corresponding to the load zone portion of said first format* whether [the format of said data in a load zone portion of] said tape is written in said [standard] *first format* or [a non-standard] *said other* format;

means for moving said head [to] *across* successive tracks toward [an] *one lateral* edge of said tape if the determined format is [non-standard] *said other format*;

means for [reading data] *detecting whether data is present* in the data zone portions of said successive *longitudinal* tracks *as said head moves toward said one lateral* edge of said tape;

means for identifying the *location of said one lateral* edge of said tape when [no] data is [read] *no longer detected*; and means for moving said head a [known] *predetermined* distance from the *identified location of said one lateral* edge of said tape to [said] *the* reference track *of said tape*.

21. The tape drive recited in claim 20 wherein magnetic tapes written in said [standard] *first* format have reference bursts in said load zone portions of said tracks and wherein the means for determining whether said tape is written in said [standard] *first format* or [non-standard] *said other* format comprises:

means for searching for said reference bursts in *the portion of said tape corresponding to* said load zone *portion of said first format*; and means for providing an indication that said tape is written in [a non-standard] *said other* format if [no such] *said* reference bursts are *not* detected.

22. The tape drive recited in claim 21 further comprising:

means for moving said tape through said load zone *portion* into said data zone *portion* before [data] *detecting whether data is present* in *said* successive *longitudinal* tracks [is read].

23. The tape drive recited in claim 20 further comprising:

a stepper motor for moving said head is incremental steps across said tape.

24. The tape drive recited in claim 23 wherein said head is moved a [known] *pre-determined* distance from the *identified location of said one lateral* edge of the tape by actuating said stepper motor a fixed number of times to move said head a fixed number of incremental steps.

25. The tape drive recited in claim 20 in combination with a controller and a host computer, said tape drive being connected through an interface to said controller[;], *said combination further comprising:* means in said host computer for generating a REPORT DRIVE CONFIGURATION command *that is* applied to said drive through said interface; and means in said drive for generating a NON-STANDARD MODE status to said controller through said interface in response to a determination that said tape is written in said [non-standard] *other* format.

26. The magnetic tape drive recited in claim 20 wherein said [standard] *first* format [tape] is written in segments of data along each of said tracks, wherein there are relatively large blank gaps between said segments, wherein an index pulse is generated at the end of each gap signifying the start of each data segment, and wherein said [non-standard tapes have] *other format has* relatively small blank gaps between data segments and irrelevant data in a remaining portion [of a track] between the data segments *of said longitudinal tracks*, said tape drive further comprising:

means for detecting said relatively small blank gaps;

means for timing out a remainder of time in said blank gaps between data segments in response to said detection; and means for generating an artificial index pulse at the end of the timing out, said index pulse being supplied to an interface of said tape drive.

27. The tape drive recited in claim 26 *wherein* the tape drive is connected to a controller by [an] *said* interface which transmits a SKIP command to the tape drive specifying movement of *the* tape by a specified number of data segments in the forward or reverse direction, said tape drive further comprising:

means for performing [a] *the* SKIP command on a [non-standard] tape *having said other format* including:

means for counting said small blank gaps during performance of [a] *the* SKIP command; and means for exiting the performance of said SKIP command when the count equals said specified number of data segments.

28. The tape drive recited in claim 27 wherein said means for counting comprises:

a counter, said counter being set with the specified number of data segments to be skipped, said counter being decremented each time a short duration gap is detected; and wherein said means for exiting is responsive to the count in said counter means.

29. The tape drive recited in claim 26 *wherein said tape is written in either said first format or one of a plurality of different types of other formats,* further comprising:

means for determining the length of said data segments on *a tape determined to be written in one of* said [non-standard tapes] *other formats*; and means for indicating the type of [non-standard] *other format in which said* tape *is written* based on the length of said data segments.

*30. The method recited in claim 1 wherein said first format is characterized by reference bursts in said load zone portion, and wherein said step of determining whether said tape is written in said first format, said other format, or is unformatted comprises:*

*providing an indication that said tape is written in said first format if reference bursts are detected in the load zone portion of said tape, but if no such reference bursts are detected, moving said tape so that said head reads the data zone portion of said tape; and*

*indicating that said tape is not formatted if no data is read in said data zone, but if data is read in said data zone, indicating that said tape is written in said other format.*

*31. The method recited in claim 7 wherein said step of moving said head a predetermined distance to the reference track of a tape having said other format comprises:*

*moving said head across successive tracks toward one lateral edge of said tape;*

*detecting whether data is present in the data zones of said successive tracks as said head moves toward said one lateral edge;*

*identifying the location of the lateral edge of said tape when data is no longer detected; and*

*moving said head a predetermined distance from the identified location of said one lateral edge of said tape to the reference track.*

*32. In a magnetic tape drive of the type in which a magnetic head is moved across a magnetic tape to read data on longitudinal tracks between the lateral edges of said magnetic tape, a method of determining whether a tape is written in a first format or an other format or is unformatted, said first format having a load zone portion and a data zone portion and reference bursts in longitudinal tracks in said load zone portion, said other format having a data zone portion but having no such reference bursts in a portion corresponding to the load zone portion of said first format, said method comprising:*

*reading a portion of said tape corresponding to the load zone portion of said first format;*

*providing an indication that said tape is written in said first format if reference bursts are detected when reading said portion corresponding to the load zone portion of said first format, but if no reference bursts are detected, moving said tape so that said head reads the data zone portion of said tape; and*

*indicating that said tape is not formatted if no data is read in said data zone, but if data is read in said data zone, indicating that said tape is written in said other format.*

*33. The method recited in claim 32 wherein if the format of said tape is determined to be said other format, the following additional steps are performed:*

*moving said head across successive tracks toward one lateral edge of said tape;*

*detecting whether data is present in the data zone portions of said successive longitudinal tracks as said head moves toward said one lateral edge of said tape;*

*identifying the location of the lateral edge of said tape when data is no longer detected; and*

*moving said head a predetermined distance from the lateral edge of said tape to the reference track of said other format.*

*34. The method recited in any one of claims 1, 7, 8, 12, 15, 16, or 32, wherein said first format comprises a QIC format, and wherein said other format comprises an Irwin format.*

*35. The magnetic tape drive recited in claim 20 wherein said first format comprises a QIC format, and wherein said other format comprises an Irwin format.*

* * * * *